Figure 1:
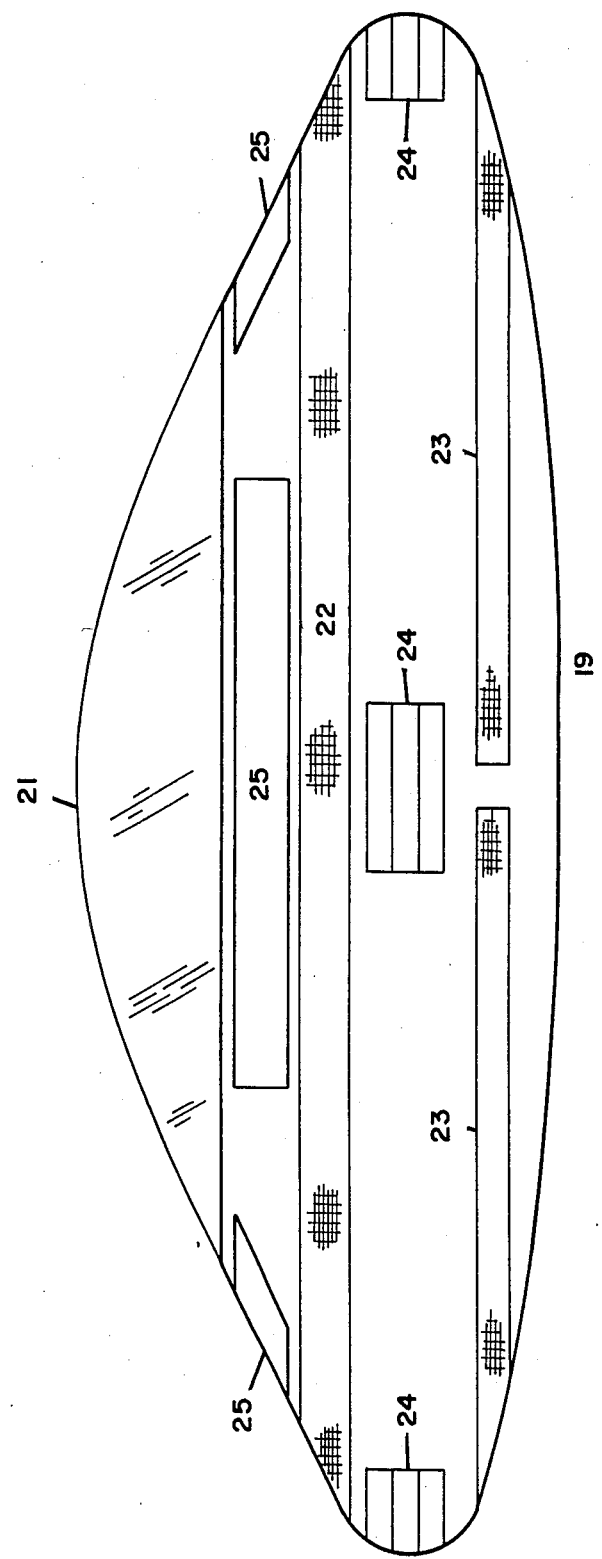

United States Patent [19]

Harmon

[11] Patent Number: 4,804,156

[45] Date of Patent: Feb. 14, 1989

[54] CIRCULAR AIRCRAFT

[76] Inventor: Rodney D. Harmon, 4288 Burnett Rd., Lincoln, Calif. 95648

[21] Appl. No.: 78,905

[22] Filed: Jul. 28, 1987

[51] Int. Cl.⁴ ............................................. B64C 39/06
[52] U.S. Cl. ................................................... 244/23 C
[58] Field of Search ................. 244/12.2, 23 R, 23 C, 244/58, 60

[56] References Cited

U.S. PATENT DOCUMENTS

| | | | |
|---|---|---|---|
| 2,462,201 | 2/1949 | Kilgore et al. | 244/60 |
| 2,567,392 | 9/1951 | Naught | 244/23 C |
| 2,935,275 | 5/1960 | Grayson | 244/23 C |
| 4,605,185 | 8/1986 | Reyes | 244/58 |

FOREIGN PATENT DOCUMENTS

| | | | |
|---|---|---|---|
| 474805 | 8/1974 | Australia | 244/12.2 |
| 750805 | 1/1967 | Canada | 244/12.2 |

Primary Examiner—Galen Barefoot
Assistant Examiner—Rodney Corl

[57] ABSTRACT

The invention relates to circular aircraft and in particular to circular aircraft having an impeller for providing horizontal and vertical thrust. Internal frameworks are provided for defining an outer circumference of convexo-convex shape, an impeller housing, a control, passenger and cargo section and an appendage bracket. Controls are provided on the aircraft for directional control and control of counter-rotation. Electrical power sources are provided to drive the impeller, as well as an alternate power supply in the form of an internal combustion engine.

1 Claim, 4 Drawing Sheets

CIRCULAR AIRCRAFT

This invention relates to aircraft, and more particularly circular aircraft, which is a most desirable design for vertical take-off and landing, being one of several primary objects of this invention.

In considering the concept of ascent and descend aircraft, it must be realized the advantages of such aircraft over conventional type aircraft. One of the best advantages being safety. Conventional aircraft, in most areas, require the take-off and landing of the craft to cross over populated areas at a high rate of speed and relatively low altitudes for a considerable distance and if there occurs mechanical failure, the danger of loss to life and property are great. With the present invention, this is minimized due to its' ability to descend directly onto its' port at much slower speeds and very minimal noise. Because of its' ability to do this, it creates another advantage, being economical, in the sense that it requires less property for its' port, not needing runways.

Although other patents have been issued for aircraft of this particular type, they all appear to be very complicated and very costly to construct. Another object of the present invention is to provide a simply designed, cost efficient to construct, as well as operate, vertical ascent and descend aircraft.

Other objects of the present invention is to provide an aircraft basically circular in design and constructed in which lift is achieved by a circular designed, housed around the perimeter, housed impeller, designed to pull air in and force the air downward and outward. Said impeller to connect to a central power source through two or more arms. To provide an external framework of Rib-Type construction, spaced equally apart to form a circular shape. To provide an internal framework of pre-stressed truss design to house a passenger/cargo and control center and help support the present invention as a whole. To provide triangular spaced landing gear for the present invention to ascent from and descend onto. To provide a design that uses strategically placed intake and exhaust ports, being controlled by sliding panels, to control for forward, backward and sideway movement. To further provide an airduct extending from the housing of the power impeller, terminating at the outer perimeter of the craft. The exhaust of air being controlled by a damper, to counter the rotation of the craft caused by the directional rotation of the power impeller. Another feature added for control of the craft while in flight and for gliding purposes if there is a power failure, is external control flaps simular to those on the wings of conventional aircraft.

The above objects and advantages as well as other objects and advantages will become readily apparent to those skilled in the arts, when taken in conjunction with the following detailed description and accompanying drawings of the present invention.

In the drawings, which are to be regarded as merely illustrative:

FIG. 1: Is a front elevational view of the present preferred invention showing to advantage the side exhaust ports.

Figure 2:
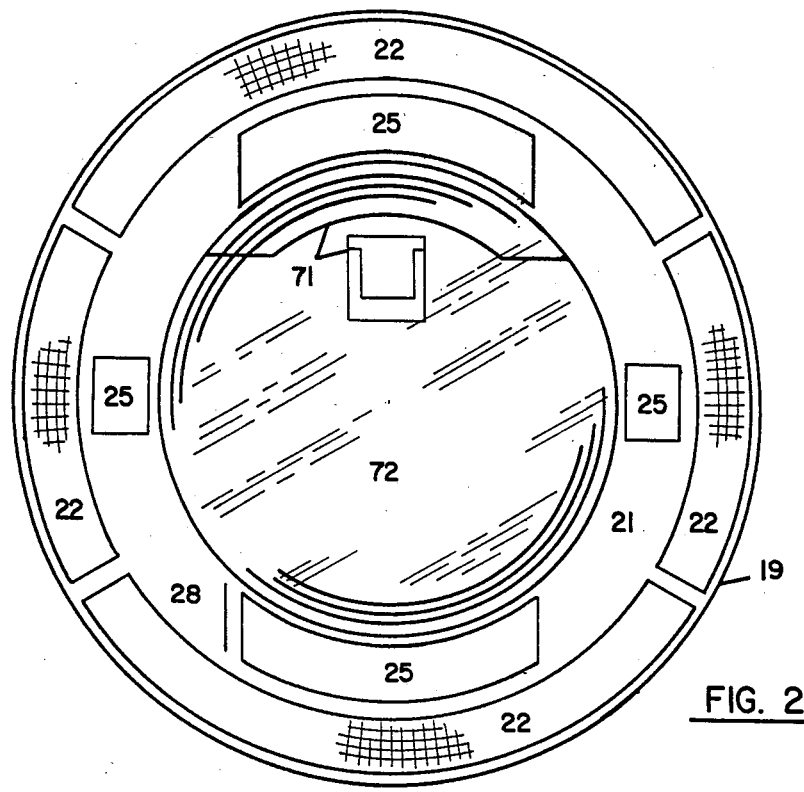

FIG. 2: Is a top plan view showing to advantage the cabin compartment, screened intake area and external top control flaps.

Figure 3:
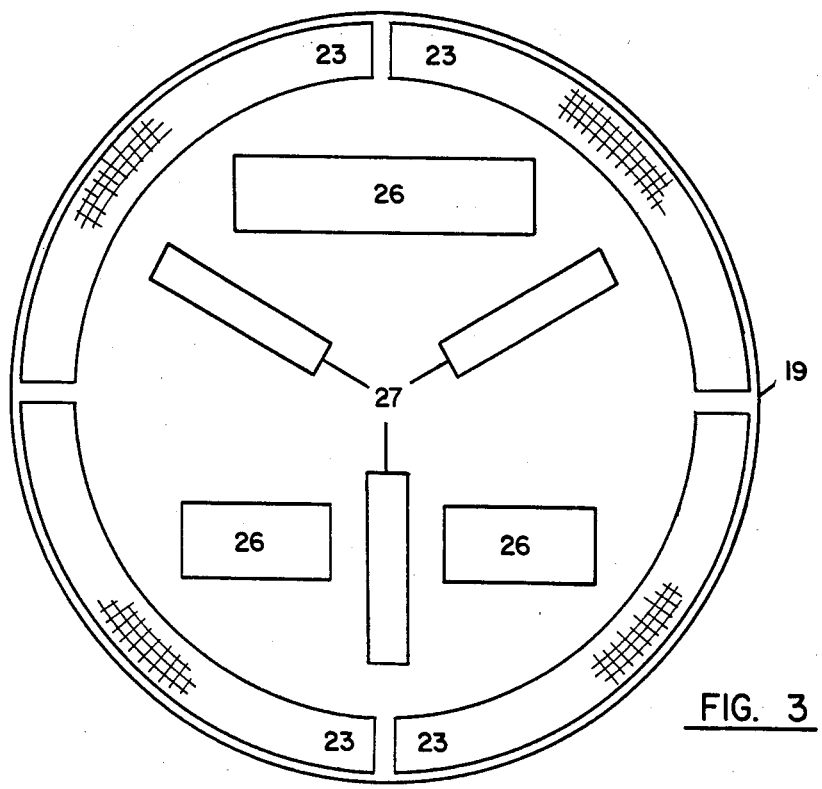

FIG. 3: Is a bottom plan view showing to advantage the screened vertical exhaust area, the bottom external control flaps and the landing gear.

Figure 4:
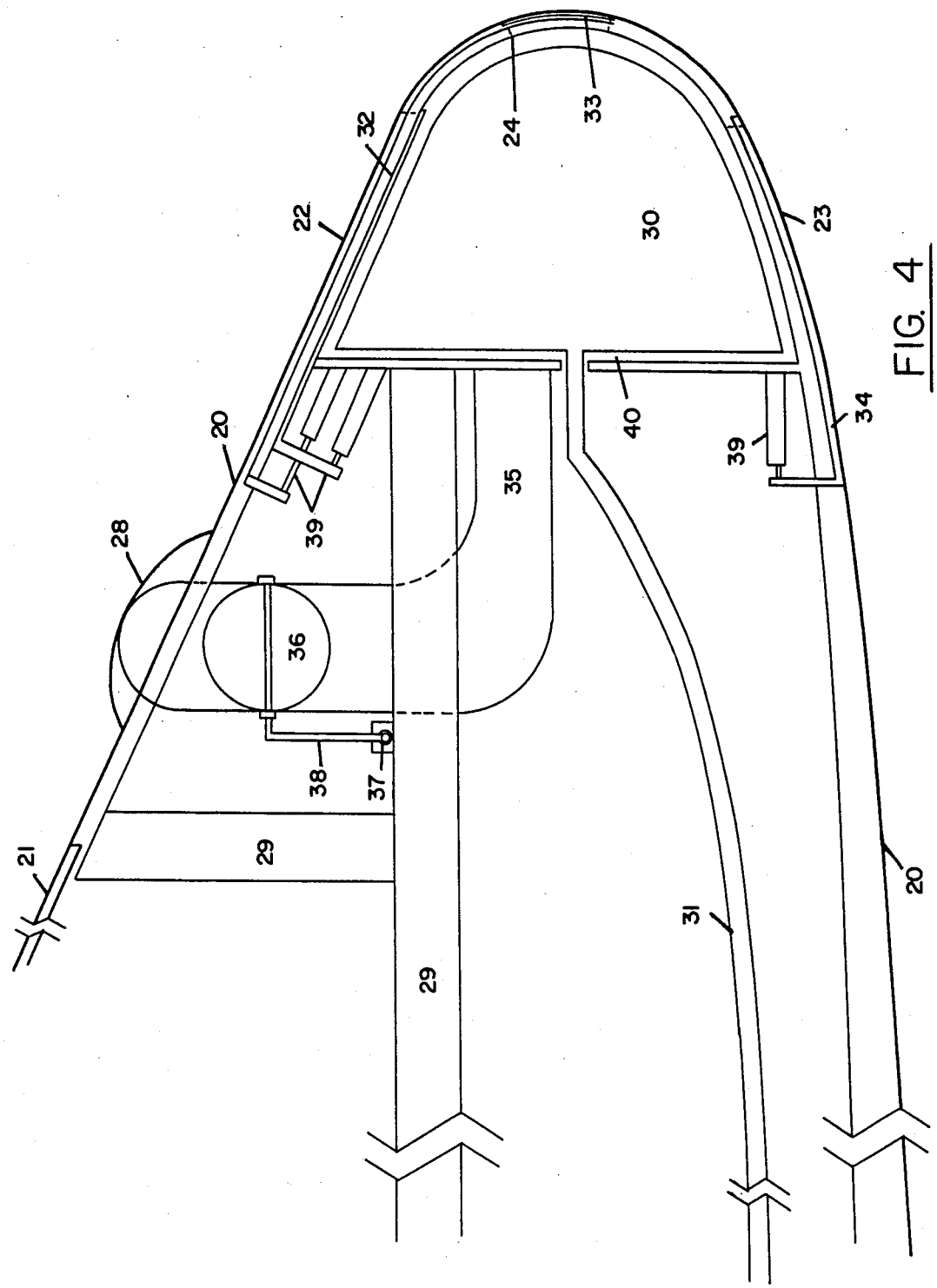

FIG. 4: Is a cross sectional view showing to advantage parts of the airduct and controlled baffle, for counter rotation control, the exhaust port slide plates and control cylinders, the power impeller housing and an illustrative impeller blade and connecting arm.

Figure 5:
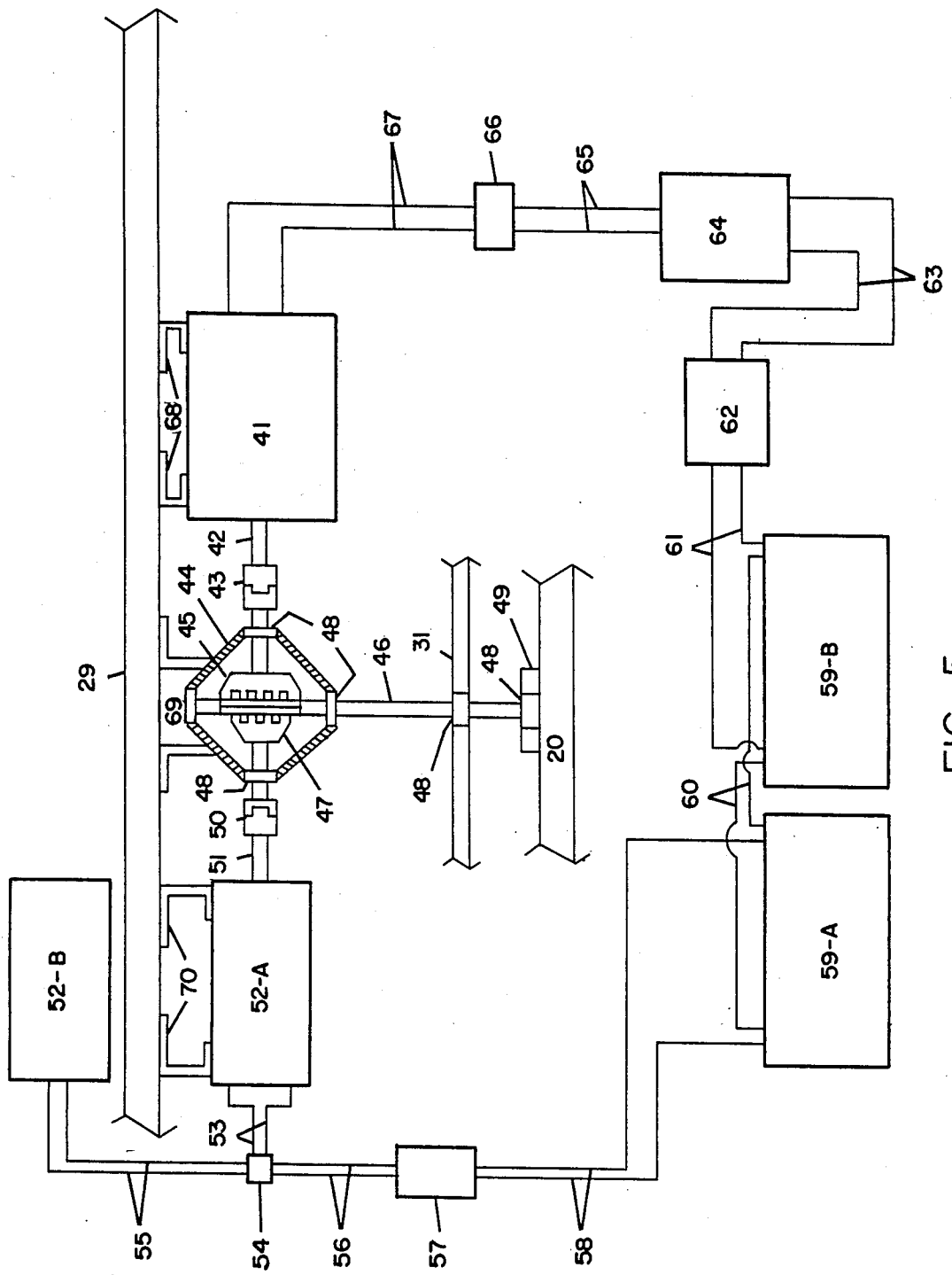

FIG. 5: Is a illustrative schematic lay-out showing to advantage the power source to the power impeller, the generation system and re-generation system.

Referring now to the drawings in greater detail, there is shown in (FIG. 1), a front elevation view of a Aero-Dynamic Designed Circular Aircraft consisting of a main body generally designated 19 angling from the horizontal to a clear canopy 21 housing a passenger/cargo area 72 and control center 71 (FIG. 2).

Four or more side exhaust ports 24 are placed around the circumference of the craft to provide forward, backward and lateral movement. Also provided for total control and all angles of movement of the craft, once in flight, are external control flaps 25 and 26 (FIGS. 1, 2, and 3) placed in front, back and sides, top and bottom of the craft.

Lift is accomplished by the rotation of the power impeller 30 (FIG. 4) located in housing 40 around the circumference of the present invention. Power impeller 30 will have a design so as to pull air in through top screened are 22 (FIGS. 1, 2, and 4) to power impeller housing 40 (FIG. 4) and force it downward, outward and rearward. The amount of air intake will be controlled by slide plates 32 (FIG. 4) placed strategically around the top circumference of the craft 19 under screened area 22. Slide plates 32 will be controlled by pneumatic cylinders 39 (FIG. 4) or other means (not shown). As air is pulled in and forced downward, strategically placed slide plates 34 (FIG. 4) around the bottom circumference, located under screened area 23, are opened allowing air to be forced downward, thus forcing the present Invention 19 upward. Balance of the present Invention 19 on lift off is accomplished by the throttling of bottom slide plates 34 at the necessary points of the circumference.

When the desired altitude is achieved and forward movement is desired, slide plate 24 (FIG. 4) in the aft locations of the present Invention 19, is partially opened to provide forward thrust, while slide plates 34 are being closed, and a portion of slide plates 32 are closed, allowing air intake at the front of the present invention.

Once the present Invention 19 is in flight, attitude of the present Invention 19 is achieved through manipulation and coordination of exterior control flaps 25 and 26 (FIGS. 1, 2, and 3) and slide port controls 32, 33 and 34 (FIG. 4). Coordination of attitude control can be achieved through a modern technological computer system (not shown).

To counter the rotation of the present Invention 19, caused by the rotation of the power impeller 30 there is provided an airduct system 35 (FIG. 4) extending from the impeller housing 40 to the exterior of the present Invention 19 exhausting to the atmosphere through a shroud 28 (FIGS. 2 and 4). Control of air flow to the atmosphere is accomplished by providing a baffle in the duct system connected to a control arm 38, connected to a control cylinder 37.

(FIG. 5) details the power source to the power impeller 30 of the present Invention 19, beginning with one or more fully charged battery banks 59a and 59b there is shown connecting wires 60 between battery banks 59a and 59b. Wires 61 from battery banks 59a and 59b enter a voltage converter 62, from voltage converter wires 63 enter an electrical distribution panel 64, from the electrical distribution panel 64, wires 65 connect to a variable speed control switch 66, from the variable speed control switch 66, wires 67 are connected to an electric motor 41, mounted to interior framework 29 by mounting brackets 68. As the electric motor 41 turns, power is provided to shaft 42 which is connected through a bearing 48 to a drive gear 45 by means of a coupler 43, drive gear 45 is connected to a geared drive shaft 46 that extends through gear housing 44 by means of a bearing 48 and connects to power impeller arms 31. Geared drive shaft 46 terminates in a bearing 48, housed in bearing housing 49 which is mounted to outer framework 20.

To prolong the eventual depletion of power from the battery bank(s) 59a and 59b, there is provided a generation system 52 mounted to the interior frame 29 with bracket 70. The generation system 52 is powered by a gear 47 connected to the geared driveshaft 46, connected to the generation system 52a by a shaft 51, passing through the differential housing 44 in a bearing 48 and interrupted by a coupler 50 as the generation system 52a turns, power is fed to a two-way switch 54 through wires 53. From the two-way switch 54, wires are connected to a high amperage battery charger, which in turn provides a fast high amperage charge, through wires 58, to the battery bank(s) 59a and 59b.

Before this system depletes itself to the point of nonoperation, there is provided an example of a back-up generation system 52b, that ties into the system through wires 55 to the two-way switch or other means (not shown) powered by an internal combustion engine (not shown). There could also be provided a solar power source (not shown).

My description in detail of the present preferred invention will suggest changes and substitutions from my disclosure.

What I claim is:

1. A circular aircraft comprising:
   a. An outer and inner frame work designed to form a circumference of convexo-convex shape, a frame work to provide a power impeller housing around the circumference, a central frame work to provide, in the central region of the circumference, a canopied control, passenger and cargo section; a further frame work and bracket assembly to provide for any necessary appendage to the aircraft;
   b. External control flaps, screened top air intake ports, screened bottom and side exhaust ports provided with strategically placed slide plates and operated from a central control center, providing a dual control system for the total control of movement of the aircraft;
   c. An airduct system for control of counter rotation extending from the power impeller housing and exhausting to the atmosphere through a controlled damper;
   d. A power impeller designed to provide vertical lift and horizontal thrust housed in the outer circumference of the aircraft;
   e. A power source consisting of one or more battery bank(s), a voltage convertor, a variable speed control, an electric motor, a gear differential, a generator and back-up generator and a battery charger, connecting to the power impeller by connecting arms from a geared driveline extending from the gear differential;
   f. An alternate power supply to the power impeller consisting of a internal combustion engine.

* * * * *